(12) United States Patent
Chen et al.

(10) Patent No.: US 12,305,045 B2
(45) Date of Patent: May 20, 2025

(54) POLYAMIDE COATING SLURRY AND ITS PREPARING METHOD, AND PROCESS FOR PREPARING POLYAMIDE-COATED FABRIC FOR PRINTING

(71) Applicant: Zhejiang King Label Technology Co., Ltd., Huzhou (CN)

(72) Inventors: Zhijie Chen, Wenzhou (CN); Xianghong Wang, Wenzhou (CN); Wenchang Lang, Wenzhou (CN); Dongming Qi, Wenzhou (CN)

(73) Assignee: Zhejiang King Label Technology Co., Ltd., Huzhou (CN)

( * ) Notice: Subject to any disclaimer, the term of this patent is extended or adjusted under 35 U.S.C. 154(b) by 85 days.

(21) Appl. No.: 18/348,357

(22) Filed: Jul. 7, 2023

(65) Prior Publication Data
US 2024/0010858 A1    Jan. 11, 2024

(30) Foreign Application Priority Data
Jul. 7, 2022   (CN) .......................... 202210804080.0

(51) Int. Cl.
| | | |
|---|---|---|
| *C09D 11/106* | (2014.01) | |
| *C09D 11/033* | (2014.01) | |
| *C09D 11/037* | (2014.01) | |
| *D06P 1/52* | (2006.01) | |
| *D06P 1/673* | (2006.01) | |
| *D06P 3/24* | (2006.01) | |
| *D06P 3/52* | (2006.01) | |
| *D06P 3/60* | (2006.01) | |

(Continued)

(52) U.S. Cl.
CPC .......... *C09D 11/106* (2013.01); *C09D 11/033* (2013.01); *C09D 11/037* (2013.01); *D06P 1/5228* (2013.01); *D06P 1/5278* (2013.01); *D06P 1/67358* (2013.01); *D06P 1/67383* (2013.01); *D06P 5/001* (2013.01); *D06P 5/2077* (2013.01); *D06P 3/24* (2013.01); *D06P 3/52* (2013.01); *D06P 3/60* (2013.01)

(58) Field of Classification Search
CPC ......... C09D 11/106; D06P 1/5278; D06P 3/24
See application file for complete search history.

(56) References Cited

U.S. PATENT DOCUMENTS 5,593,941 A * 1/1997 Kato ........................ B41M 5/52
427/152

FOREIGN PATENT DOCUMENTS

| CN | 104231734 A | * | 12/2014 |
| CN | 113389062 A | * | 9/2021 |

OTHER PUBLICATIONS

CN104231734A, machine translation. (Year: 2014).*
CN113389062A, machine translation. (Year: 2021).*

* cited by examiner

*Primary Examiner* — Robert A Vetere
(74) *Attorney, Agent, or Firm* — Zhigang Ma

(57) ABSTRACT

A polyamide coating slurry and its preparing method, and a process for preparing polyamide-coated fabric for printing are provided. The present disclosure provides a polyamide coating slurry for precise inkjet printing with wide applicability simple preparation steps. The surface structure and lipophilicity of the coating can be changed by mixing polyvinyl butyral and polyoxypropylene lauryl ether, urea and poly-N-isopropylacrylamide in polyamide 6, so that the adsorption properties and permeability of the coating to ink
(Continued)

are greatly improved, and thus high-precision inkjet printing can be realized.

9 Claims, 1 Drawing Sheet

(51) Int. Cl.
*D06P 5/00* (2006.01)
*D06P 5/20* (2006.01)

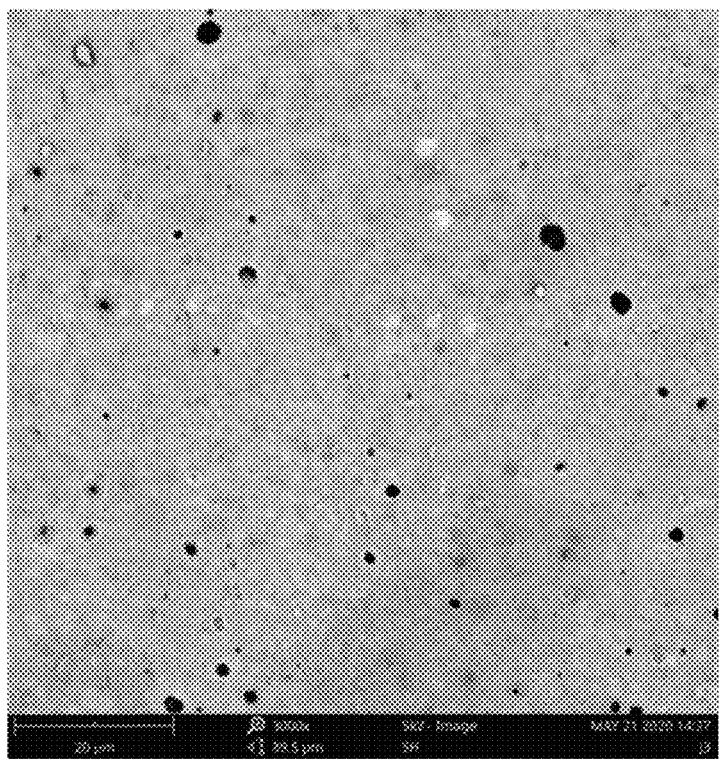

POLYAMIDE COATING SLURRY AND ITS PREPARING METHOD, AND PROCESS FOR PREPARING POLYAMIDE-COATED FABRIC FOR PRINTING

1. TECHNICAL FIELD

The present disclosure relates to the field of preparation of a polyamide coating slurry and its coated fabric, in particular to a preparation method of a polyamide-coated fabric for precise inkjet printing and a subsequent preparation process of the coated fabric.

2. BACKGROUND OF RELATED ARTS

Polyamide is an important chemical fiber material, which has many advantages such as wear resistance and high strength. Using polyamide as a coating coated on a surface of a fabric can not only change the appearance and feel of the fabric, but also give the fabric special functions. At present, the production methods of polyamide-coated fabrics mainly include dry coating and wet coating. The process and equipment of dry coating are relatively simple, but the products made by dry coating have poor feel and rough appearance; as for wet coating, the process is more complicated and the equipment is larger, but the products made by wet coating has excellent feel and moisture permeability, and is mainly used in production of synthetic leather and label cloth. Polyamide wet coating uses ethanol-calcium chloride solvent to dissolve nylon waste silk to prepare coating slurry. After coating, a phase inversion occurs in a coagulation bath to form a layer of polymer film on the surface of the fabric.

At present, polyamide-coated fabrics are widely used in trademark printing, inkjet printing and other fields. With the continuous improvement of printing accuracy and printing speed, the existing polyamide coating can no longer meet the requirements of high-precision inkjet printing. There are two main reasons:

1) In the existing polyamide coating system, powders such as calcium carbonate and kaolin are mostly used as fillers to add to the coating slurry to increase the feel and thickness of the coating. However, calcium carbonate and kaolin have poor functionality and rough particles, which are not conducive to the absorption of ink on the surface of the coated fabric.
2) The polyamide 6 coating itself does not have high adsorption and permeability to ink. There are micron-sized holes on the surface of the coating, which is easy to cause the diffusion and blurring of ink lines. It is difficult for ink to quickly absorb and dried that is not conducive to the printing of QR codes and barcodes with high fineness.

SUMMARY

The object of the present disclosure is to provide a polyamide coating slurry, a preparation method and a process for preparing a polyamide-coated fabric for printing in order to overcome the shortcomings and deficiencies of the prior art. This technical solution can solve the problems of traditional polyamide coatings such as difficulties in precise inkjet printing and poor ink absorption.

To achieve the above object, the first aspect of the present disclosure is to provide a polyamide coating slurry, including a solute, a solvent, and a functional auxiliary agent, wherein the solute includes polyamide 6, polyvinyl butyral, polyoxypropylene lauryl ether, urea, and poly-N-isopropylacrylamide;

the solvent is ethanol; and the functional auxiliary agent includes calcium chloride and lipophilic nano silica sol.

In a further aspect, the mass fraction of each of the components of the solute in the polyamide coating slurry is as follows:

polyamide 6: 4%-6%;
polyvinyl butyral: 6%-8%;
polyoxypropylene lauryl ether: 1%-5%;
urea: 1%-3%;
poly-N-isopropylacrylamide: 1%-5%.

In a further aspect, the mass fraction of each of the components of the functional auxiliary agent in the polyamide coating slurry is as follows:

calcium chloride: 10%-20%;
lipophilic nano silica sol: 5%-10%.

In a further aspect, the lipophilic nano silica sol is an ethanol dispersion liquid of nano silica, including components as follows by mass fraction:

ethanol: 70-75%;
nano silica: 25-30%, with an average particle size of 50 nm-80 nm.

In a further aspect, the number-average molecular weight of the polyvinyl butyral is 2000-50000, and the number-average molecular weight of the polyoxypropylene lauryl ether is 2000-20000, the number-average molecular weight of poly N-isopropylacrylamide is 10000-50000.

The second aspect of the present disclosure is to provide a method for preparing a polyamide coating slurry as described above, including steps of: dissolving calcium chloride in ethanol with fully stirring, adding a solute into the ethanol and stirring, heating to 60° C.-65° C., cooling to 25° C. after complete dissolution of the solute, and then slowly adding lipophilic nano silica sol and thoroughly mixing, to obtain the polyamide coating slurry.

The third aspect of the present disclosure is to provide a process of a polyamide coating slurry as described above for preparing a polyamide-coated fabric, including steps of: dissolving an organic calcium salt in a polyamide coating slurry and then applying onto a surface of a fabric by immersion and rolling, performing water exchange in water for 3-5 minutes, and then drying at 120° C.-130° C.

The polyamide coating slurry in the present disclosure contains a component like lipophilic nano silica sol. Thus, in order to increase the fluidity of the polyamide coating slurry and the efficiency of water exchange, it is necessary to add organic calcium salt (for example, calcium L-lactate) as an auxiliary agent. The mass fraction of the organic calcium salt accounts for 0.5%-1% of the polyamide coating slurry. Otherwise, the aggregation and precipitation of silica sol will be easily caused.

In a further aspect, the material of the fabric comprises nylon, polyester, cotton, and silk.

The present disclosure greatly improves the lipophilicity of the polyamide coating by changing the composition of the coating, thereby greatly improving the adsorption properties and permeability of the coating to ink, which is beneficial to the precise inkjet printing of a subsequent coating or coatings.

The beneficial effects of the present disclosure are:
1. The present disclosure provides a polyamide coating slurry for precise inkjet printing with wide applicability, green pollution in the preparation process and simple steps, and develops a process of preparing a coating corresponding to the polyamide coating slurry.
2. The polyamide coating slurry of the present disclosure changes the surface structure and lipophilicity of the coating by mixing polyvinyl butyral and polyoxypropylene lauryl ether in polyamide 6, so that the coating has good adsorption properties and permeability to ink. The permeability is greatly improved, and thus high-precision inkjet printing can be realized.
3. The present disclosure uses lipophilic nano silica sol instead of conventional calcium carbonate, kaolin and other substances as a filler (for example, a functional auxiliary agent) of polyamide coating slurry. Lipophilic nano silica sol can be evenly distributed inside and on the surface of the coating, which can effectively enhance the lipophilicity of the coating and improve adsorption properties and permeability of the coating to ink to meet the needs of precise inkjet printing.
4. Urea and poly-N-isopropylacrylamide can effectively increase absorption and diffusion of the coating itself to ink, which is conducive to the rapid ink absorption and drying of the coating during printing.

BRIEF DESCRIPTION OF DRAWINGS

In order to more clearly illustrate the embodiments of the present disclosure or the technical solutions in the prior art, the following will briefly introduce the drawings that need to be used in the description of the embodiments or the prior art. Obviously, the accompanying drawings in the following description are only some embodiments of the present disclosure. For a person of ordinary skill in the art, obtaining other drawings based on these drawings still belongs to the scope of the present disclosure without any creative effort.

FIG. 1 is an SEM photograph of a coating morphology on a surface of a coated fabric prepared in Example 1.

DETAILED DESCRIPTIONS OF EMBODIMENTS

In order to make the object, technical solution and advantages of the present disclosure clearer, the present disclosure will be further described in detail below in conjunction with the accompanying drawings.

Examples 1-9

According to the distribution ratio shown in Table 1, calcium chloride is added to ethanol and fully stirred and dissolved, then polyamide 6, polyoxypropylene lauryl ether, and polyvinyl butyral are added to ethanol and stirred, and the temperature is raised to 60° C.-65° C. for forming a solution. After the solute is completely dissolved, the solution is cooled down to 25° C., then lipophilic nano silica sol is slowly added to the solution and mixed evenly in the solution to obtain a wet coating slurry. Organic calcium salt is added to and dissolved in the wet coating slurry. Next, the wet coating slurry is applied on a surface of a fabric by immersion and rolling, then water exchange is performed in water for 3-5 minutes, and the wet coating slurry on the fabric is finally dried at 120° C.-130° C., and then a coated fabric corresponding to one of Examples 1-9 is produced.

Comparative Examples 1-3

According to the distribution ratio shown in Table 2, calcium chloride is added into ethanol and stirred to be dissolved, then polyamide 6 is added into the ethanol and stirred, and then the above components are heated up to 60° C.-65° C. after the solute is completely dissolved in the ethanol to form a solution. After the solution is cooled down at 25° C., a wet coating slurry is obtained. organic calcium salt is added to and dissolved in the wet coating slurry, Next, the wet coating slurry is applied on a surface of a fabric by immersion and rolling, then water exchange is performed in water for 3-5 minutes, and the wet coating slurry on the fabric is finally dried at 120° C.-130° C., and then a coated fabric corresponding to one of Comparative examples 1-3 is produced.

TABLE 1

The distribution ratio (%) of each of the components of the polyamide coating slurry respectively in Examples 1-9 (Kg)

| | Example | | | | | | | | |
|---|---|---|---|---|---|---|---|---|---|
| | 1 | 2 | 3 | 4 | 5 | 6 | 7 | 8 | 9 |
| calcium chloride | 15 | 13 | 16 | 20 | 15 | 10 | 20 | 18 | 20 |
| polyamide 6 | 5 | 5 | 6 | 4 | 6 | 5 | 5 | 6 | 6 |
| polyvinyl butyral | 6 | 6 | 8 | 7 | 8 | 7 | 8 | 8 | 8 |
| polyoxypropylene lauryl ether | 1 | 2 | 3 | 4 | 5 | 3 | 2 | 3 | 3 |
| lipophilic nano silica sol | 5 | 7 | 8 | 10 | 10 | 8 | 8 | 7 | 6 |
| urea | 3 | 1 | 1 | 1 | 2 | 2 | 1 | 2 | 2 |
| poly-N-isopropylacrylamide | 4 | 3 | 1 | 2 | 3 | 4 | 5 | 2 | 3 |
| ethanol | 61 | 63 | 57 | 52 | 51 | 61 | 51 | 54 | 52 |

TABLE 2

The distribution ratio of each of the components of the slurry respectively Comparative examples 1-3 (Kg)

| | Comparative example 1 | Comparative example 2 | Comparative example 3 |
|---|---|---|---|
| calcium chloride | 15 | 10 | 20 |
| polyamide 6 | 8 | 6 | 8 |
| calcium carbonate | 5 | 0 | 3 |
| kaolin | 0 | 8 | 3 |
| ethanol | 72 | 76 | 66 |

In order to better reflect the advantages of the present disclosure, the following performance tests are carried out on the coated fabrics obtained in Examples 1-9 of the present disclosure and Comparative Examples 1-3, and the test results are as described in Tables 3 and 4.

TABLE 3

Test results of the performances of Examples 1-9

| | Example | | | | | | | | |
|---|---|---|---|---|---|---|---|---|---|
| | 1 | 2 | 3 | 4 | 5 | 6 | 7 | 8 | 9 |
| Whiteness | 90 | 89 | 90 | 91 | 90 | 91 | 92 | 90 | 90 |
| Fastness to dry rubbing/grade | 4 | 4 | 4 | 4 | 4 | 4 | 4 | 4 | 4 |
| Fastness to wet rubbing/grade | 4-5 | 4 | 4 | 4 | 4 | 4 | 4-5 | 4 | 4 |
| Fastness to water-washing/grade | 4 | 4 | 4 | 4 | 4 | 4 | 4 | 4-5 | 4 |
| Ink absorption time/s | 5 | 6 | 4 | 7 | 8 | 4 | 8 | 5 | 4 |

TABLE 4

Test results of the performances of Comparative examples 1-3

| Comparative example | 1 | 2 | 3 |
|---|---|---|---|
| Whiteness | 85 | 86 | 83 |

TABLE 4-continued

| Test results of the performances of Comparative examples 1-3 | | | |
|---|---|---|---|
| Comparative example | 1 | 2 | 3 |
| Fastness to dry rubbing/grade | 3-4 | 3-4 | 3-4 |
| Fastness to wet rubbing/grade | 3-4 | 3-4 | 3-4 |
| Fastness to washing/grade | 3-4 | 3-4 | 3-4 |
| Ink absorption time/s | 30 | 35 | 32 |

Note: The test method of whiteness is based on GBT 17644-2008 "Test Method for Whiteness and Chromaticity of Textile Fibers"; the test method of fastness to rubbing is based on GB/T3920-2008 "Textiles—Tests for color fastness—Color fastness to rubbing"; the test method of fastness to washing is based on GB/T3921-2008 "Textiles—Tests for color fastness—Color fastness to washing with soap or soap and soda" to evaluate the color fastness to washing of ink-printed trademark-coated fabrics. The test method of ink absorption time adopts the titration diffusion method: in a constant temperature and humidity environment, the coating cloth to be tested is flattened on a horizontal surface, the ink is titrated on the coating cloth to be tested according to equal mass, and the length of time is recorded. After the ink is completely dry, the value is read and the time length is recorded. The above steps are repeatedly performed 5 times and the average value is calculated.

The above disclosures are only preferred embodiments of the present disclosure, and certainly cannot limit the scope of rights of the present disclosure. Therefore, equivalent changes made according to the claims of the present disclosure still fall within the scope of the present disclosure.

What is claimed is:

1. A polyamide coating slurry, comprising a solute, a solvent, and a functional auxiliary agent, wherein the solute comprises polyamide 6, polyvinyl butyral, polyoxypropylene lauryl ether, urea, and poly-N-isopropylacrylamide;
   the solvent is ethanol; and
   the functional auxiliary agent comprises calcium chloride and lipophilic nano silica sol.

2. The polyamide coating slurry according to claim 1, wherein the mass fraction of each of the components of the solute in the polyamide coating slurry is as follows:
   polyamide 6: 4%-6%;
   polyvinyl butyral: 6%-8%;
   polyoxypropylene lauryl ether: 1%-5%;
   urea: 1%-3%;
   poly-N-isopropylacrylamide: 1%-5%.

3. The polyamide coating slurry according to claim 1, wherein the mass fraction of each of the components of the functional auxiliary agent in the polyamide coating slurry is as follows:
   calcium chloride: 10%-20%;
   lipophilic nano silica sol: 5%-10%.

4. The polyamide coating slurry according to claim 1, wherein the lipophilic nano silica sol is an ethanol dispersion liquid of nano silica, comprising components as follows by mass fraction:
   ethanol: 70-75%;
   nano silica: 25-30%, with an average particle size of 50 nm-80 nm.

5. The polyamide coating slurry according to claim 1, wherein the number-average molecular weight of the polyvinyl butyral is 2000-50000, and the number-average molecular weight of the polyoxypropylene lauryl ether is 2000-20000, the number-average molecular weight of poly N-isopropylacrylamide is 10000-50000.

6. A method for preparing polyamide coating slurry according to claim 1, comprising steps of: dissolving calcium chloride in ethanol with fully stirring, adding a solute into the ethanol and stirring, heating to 60-65° C., cooling to 25° C. after complete dissolution of the solute, and then slowly adding lipophilic nano silica sol and thoroughly mixing, to obtain the polyamide coating slurry.

7. A process for preparing a polyamide-coated fabric for printing, comprising steps of: dissolving organic calcium salt in the polyamide coating slurry according to claim 1 and then applying onto a surface of a fabric by immersion and rolling, performing water exchange in water for 3-5 minutes, and then drying at 120° C.-130° C.

8. The process according to claim 7, wherein the organic calcium salt is calcium L-lactate with an addition amount of 0.5 wt %-1 wt % based on the polyamide coating slurry.

9. The process according to claim 7, wherein the material of the fabric comprises nylon, polyester, cotton, and silk.

* * * * *